United States Patent
Nakamura et al.

(10) Patent No.: US 10,144,136 B2
(45) Date of Patent: Dec. 4, 2018

(54) PANEL HOLDING DEVICE AND PANEL HOLDING METHOD

(71) Applicant: HONDA MOTOR CO., LTD., Minato-ku, Tokyo (JP)

(72) Inventors: Shinsuke Nakamura, Tochigi (JP); Yuzo Yamamoto, Tochigi (JP); Hayato Sato, Tochigi (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/923,366

(22) Filed: Mar. 16, 2018

(65) Prior Publication Data

US 2018/0264656 A1 Sep. 20, 2018

(30) Foreign Application Priority Data

Mar. 17, 2017 (JP) .................. 2017-052057

(51) Int. Cl.
*B25J 15/00* (2006.01)
*B25J 15/06* (2006.01)
*B25J 13/08* (2006.01)

(52) U.S. Cl.
CPC ........... *B25J 15/009* (2013.01); *B25J 13/088* (2013.01); *B25J 15/0616* (2013.01); *Y10S 901/40* (2013.01); *Y10S 901/47* (2013.01)

(58) Field of Classification Search
CPC .... B25J 15/00; B25J 15/0253; B25J 15/0206; B25J 15/009; B25J 15/0616; B25J 13/088; B66C 3/16; B25B 5/122; B25B 5/006; E04F 21/0007; B23K 37/0408; C10B 25/14; E02F 3/404; B21D 43/105; Y10S 901/40; Y10S 901/47

See application file for complete search history.

(56) References Cited

U.S. PATENT DOCUMENTS

| | | | | |
|---|---|---|---|---|
| 5,179,774 A * | 1/1993 | Massie | ................... | B62D 65/14 29/235 |
| 5,181,307 A * | 1/1993 | Kitahama | .............. | B62D 65/06 29/11 |
| 8,256,811 B2 * | 9/2012 | Yeum | ................... | B25J 15/0061 269/905 |
| 8,592,714 B2 * | 11/2013 | Yeum | ................... | B23K 26/032 219/121.62 |
| 2006/0013646 A1 * | 1/2006 | Baulier | ................. | B23K 37/04 403/326 |

FOREIGN PATENT DOCUMENTS

JP 4103950 B2 6/2008

* cited by examiner

*Primary Examiner* — Stephen A Vu
(74) *Attorney, Agent, or Firm* — Carrier Blackman & Associates, P.C.; Joseph P. Carrier; William D. Blackman

(57) ABSTRACT

A panel conveyance system includes a pin member, a bar pad facing a panel right lower portion, a block pad facing a panel left lower portion, a bar guide positioned outside an outer edge end of the panel left lower portion, and a conveyance robot. The panel conveyance system further includes a panel take-out control unit that hangs a panel on a pin member, and a temporary retention control unit that causes the bar pad to come into contact with a surface of the panel right lower portion, causes the block pad to come into contact with a surface of the panel left lower portion, and causes the bar guide to come into contact with the panel left lower portion to temporarily retain the panel while keeping the panel hung on the pin member, and a holding control unit that holds the temporarily retained panel with a clamp.

12 Claims, 10 Drawing Sheets

PANEL HOLDING DEVICE AND PANEL HOLDING METHOD

This application is based on and claims the benefit of priority from Japanese Patent Application No. 2017-052057, filed on 17 Mar. 2017, the content of which is incorporated herein by reference.

BACKGROUND OF THE INVENTION

Field of the Invention

The present invention relates to a panel holding device and a panel holding method. More particularly, the present invention relates to a panel holding device and a panel holding method for holding a panel placed in a stocker.

Related Art

Among robots provided in vehicle manufacturing facilities, there is a conveyance robot that takes out one panel from a plurality of panels aligned in a stocker and conveys the panel to a position on a welding line or the like. The conveyance robot grasps at what position in the stocker and at what orientation the panel to be conveyed is placed using a sensor, and retains the panel while positioning the objective panel at an appropriate orientation according to a state of the objective panel.

Japanese Patent No. 4103950 discloses a method for retaining a panel hung on a hanger using a jig provided on an arm of a robot. The jig disclosed in Japanese Patent No. 4103950 is provided with three vacuum pads that suck and retain a panel at three positions, and with three distance sensors provided near the vacuum pads. In the method in Japanese Patent No. 4103950, information regarding the orientation of the panel is acquired by the three distance sensors, and appropriate positions of the panel are sucked and retained by the vacuum pads using the information.

SUMMARY OF THE INVENTION

Such a conventional panel retaining device uses the three distance sensors for detecting the orientation of the panel, and thus the cost of the facility may increase. In addition, the conventional panel retaining device detects the orientation of the panel using the plurality of distance sensors, and thus the method for controlling the jig and the robot may become complicated.

An objective of the present invention is to provide a panel holding device and a panel holding method to enable the holding of a panel at an appropriate position and orientation without using a plurality of sensors.

(1) A panel holding device (for example, a panel conveyance system S described below) of the present invention holds a panel (for example, a panel W described below) in which a hole portion (for example, a hole portion W2 described below) is formed, the panel is placed in a stocker (for example, a stocker ST described below) to cause the hole portion to be arranged on an upper side in a vertical direction, and the panel holding device includes a detection device configured to detect a position of the hole portion (for example, a camera 53 described below), a pin member to be inserted into the hole portion (for example, a pin member 52 described below), a fall-off prevention mechanism configured to prevent the panel hung on the pin member from falling off the pin member (for example, locking portions 54a and 54b described below), a frame member supporting the pin member (for example, a main frame member 2, a tool attaching portion 3, an arm member 4, and the like described below), a first contact member (for example, a bar pad 62 described below) supported by the frame member to face a first panel portion (for example, a panel right lower portion WR described below) in a state where the panel is hung on the pin member, when the panel hung on the pin member is divided into right and left portions by a vertical line (for example, a vertical line VL described below) passing through the hole portion, and in a case where a portion that is one of the right and left portions and is lower than the hole portion is the first panel portion and a portion that is the other of the right and left portions and is lower than the hole portion is a second panel portion (for example, a panel left lower portion WL described below), a sucking device supported by the frame member in a vicinity of the first contact member and configured to suck the first panel portion (for example, six vacuum caps 63 described below), a second contact member supported by the frame member to face the second panel portion in the state where the panel is hung on the pin member (for example, a block pad 71 described below), a third contact member (for example, a bar guide 72 described below) supported by the frame member to be positioned outside an outer edge end (for example, an outer edge end W3 described below) of the second panel portion in the state where the panel is hung on the pin member, a holding device supported by the frame member in a vicinity of the third contact member and configured to hold the second panel portion (for example, a clamp 73 described below), a moving device configured to move the frame member (for example, a conveyance robot 9 described below), and a control device configured to control the moving device, the sucking device, the holding device, and the fall-off prevention mechanism (for example, a control device 8 described below). The control device includes a panel take-out control unit configured to cause the pin member to be inserted into the hole portion and cause the fall-off prevention mechanism to be in a fall-off prevention state to hang the panel on the pin member by controlling the moving device using an output of the detection device (for example, the control device 8 and means regarding execution of a panel take-out step in FIG. 8 described below), a temporary retention control unit configured to cause the first contact member to come into contact with a surface of the first panel portion, cause the second contact member to come into contact with a surface of the second panel portion, and cause the third contact member to come into contact with the outer edge end of the second panel portion to temporarily retain the panel by controlling the moving device while keeping the panel hung on the pin member (for example, the control device 8 and means regarding execution of a panel temporary retention step in FIG. 8 described below), a holding control unit configured to cause the holding device to hold the second panel portion and cause the sucking device to suck the first panel portion of the temporarily retained panel (for example, the control device 8 and means regarding execution of a panel positioning and holding step in FIG. 8 described below).

(2) In this case, the holding device is preferably a clamp (for example, a clamp 73 described below) that holds the second panel portion in a thickness direction of the second panel portion.

(3) In this case, the holding device preferably holds the second panel portion while positioning it at a predetermined holding position, and the second panel portion positioned at the holding position is preferably separated from the second contact member.

(4) In this case, the temporary retention control unit preferably presses the surface of the first panel portion toward a back side in the thickness direction with the first contact member, preferably presses the surface of the second panel portion toward a back side in the thickness direction with the second contact member, and further preferably presses the outer edge end of the second panel portion inward with the third contact member to temporarily retain the panel by controlling the moving device while keeping the panel hung on the pin member.

(5) In this case, the holding control unit preferably causes the sucking device to suck the first panel portion after causing the holding device to hold the second panel portion.

(6) A panel holding method of the present invention is a method for holding a panel in which a hole portion is formed, using a panel holding device, the panel is placed in a stocker to cause the hole portion to be arranged on an upper side in a vertical direction, and the panel holding device includes a pin member to be inserted into the hole portion, a fall-off prevention mechanism configured to prevent the panel hung on the pin member from falling off the pin member, a frame member supporting the pin member, a first contact member supported by the frame member to face a first panel portion in a state where the panel is hung on the pin member, when the panel hung on the pin member is divided into right and left portions by a vertical line passing through the hole portion, and in a case where a portion that is one of the right and left portions and is lower than the hole portion is the first panel portion and a portion that is the other of the right and left portions and is lower than the hole portion is a second panel portion, a sucking device supported by the frame member in a vicinity of the first contact member and configured to suck the first panel portion, a second contact member supported by the frame member to face the second panel portion in the state where the panel is hung on the pin member, a third contact member supported by the frame member to be positioned outside an outer edge end of the second panel portion in the state where the panel is hung on the pin member, and a holding device supported by the frame member in a vicinity of the third contact member and configured to hold the second panel portion. The panel holding method includes a panel take-out step of causing the pin member to be inserted into the hole portion and causing the fall-off prevention mechanism to be in a fall-off prevention state to hang the panel on the pin member by moving the frame member (for example, the panel take-out step in FIG. 8 described below), a temporary retention step of causing the first contact member to come into contact with a surface of the first panel portion, causing the second contact member to come into contact with a surface of the second panel portion, and causing the third contact member to come into contact with the outer edge end of the second panel portion to temporarily retain the panel by changing an orientation of the frame member with respect to the panel while keeping the panel hung on the pin member (for example, the panel temporary retention step in FIG. 8 described below), and a holding step of causing the holding device to hold the second panel portion and causing the sucking device to suck the first panel portion of the temporarily retained panel (for example, the panel positioning and holding step in FIG. 8 described below).

(1) In the present invention, first, the panel take-out control unit controls the moving device using the output of the detection device that detects the position of the hole portion in the panel to cause the pin member to be inserted into the hole portion in the panel placed in the stocker and causes the fall-off prevention mechanism to be in the fall-off prevention state, to cause the panel to be in a hung state on the pin member. Here, the orientation of the panel hung on the pin member (hereinafter, the orientation is referred to as "natural orientation") is roughly unique according to the shape of the panel, the position of the center of gravity, the position of the hole portion, and the like. For example, when an external force to change the orientation from the natural orientation is applied to the panel hung on the pin member, a reaction force of the panel to return to the natural orientation is applied by gravity to a portion to which the external force is applied. The temporary retention control unit of the present invention temporarily retains the panel at the same position and orientation on a constant basis using the reaction force of the panel to return to the natural orientation. To be specific, the temporary retention control unit controls the moving device while keeping the panel hung on the pin member to bring the first contact member into contact with the surface of the first panel portion, bring the second contact member into contact with the surface of the second panel portion, and bring the third contact member into contact with the outer edge end of the second panel portion, respectively. With the step, the reaction force of the panel to return to the natural orientation acts on the contact members, and thus the panel can be temporarily retained at the same position and orientation on a constant basis by the contact members. Especially, in the present invention, the panel hung on the pin member is divided into the first and second panel portions in the vertical line passing through the hole portion, and the panel is temporarily retained to be scooped up with the first and second contact members while the panel is prevented from being rotated around the vertical line as an axis, by bringing the first contact member into contact with the surface of the first panel portion and bringing the second contact member in contact with the surface of the second panel portion. Further, in the present invention, the panel can be temporarily retained while deviation along a plane perpendicular to the thickness direction of the panel is suppressed, by bringing the third contact member into contact with the outer edge end of the panel. Further, the holding control unit causes the holding device to hold the second panel portion and causes the sucking device to suck the first panel portion on the opposite side of the temporarily retained panel. With the step, the panel is held at three positions with the pin member on the vertical line, and the holding device and the sucking device positioned right and left with respect to the vertical line at lower positions than the pin member. Therefore, the panel holding device of the present invention can hold the panel at appropriate position and orientation without using a plurality of sensors. Further, in the present invention, the frame member is moved while the panel is hung on the pin member as described above, and thus the angle of the pin member with respect to the panel is changed during movement. In the present invention, the panel can be prevented from falling off the pin member during movement of the frame member by providing the fall-off prevention mechanism in the pin member.

(2) In the present invention, the temporarily retained panel is held in the thickness direction with the clamp. With the operation, the panel can be firmly held without substantially changing the position and orientation of the temporarily retained panel.

(3) In the present invention, by bringing the first to third contact members into contact with the panel as described above, the temporarily retained panel is held while positioned at a holding position separated from the second contact member by the holding device. If the position of the panel positioned by the holding device is set to a position where the panel comes into contact with the second contact member, the holding device needs to be moved to an appropriate position according to the shape and thickness of the panel, and thus a control program of the holding device needs to be changed according to the type of panel. In contrast, in the present invention, a large number of panels can be held at a prescribed holding position without changing the control program of the holding device by setting the holding position to the position where the panel is separated from the second contact member.

(4) In the present invention, an operation to press the surface of the first panel portion toward the back side in the thickness direction with the first contact member, an operation to press the surface of the second panel portion toward the back side in the thickness direction with the second contact member, and an operation to press the outer edge end of the second panel portion inward with the third contact member are performed in combination. With the operations, in the present invention, the panel can be temporarily retained at appropriate position and orientation to be scooped up with the first to third contact members, using a reaction force of the panel to return to a natural orientation.

(5) In the present invention, the panel can be firmly held without substantially changing the position and orientation of the temporarily retained panel by causing the sucking device to suck the first panel portion after causing the holding device to hold the second panel portion.

(6) The invention of the panel holding method of the present invention is a method invention converted from the invention of the panel holding device of (1), and thus exhibits substantially the same effect as the invention of the panel holding device.

DETAILED DESCRIPTION OF THE INVENTION

Hereinafter, an embodiment of the present invention will be described in detail with reference to the drawings.

Figure 1:
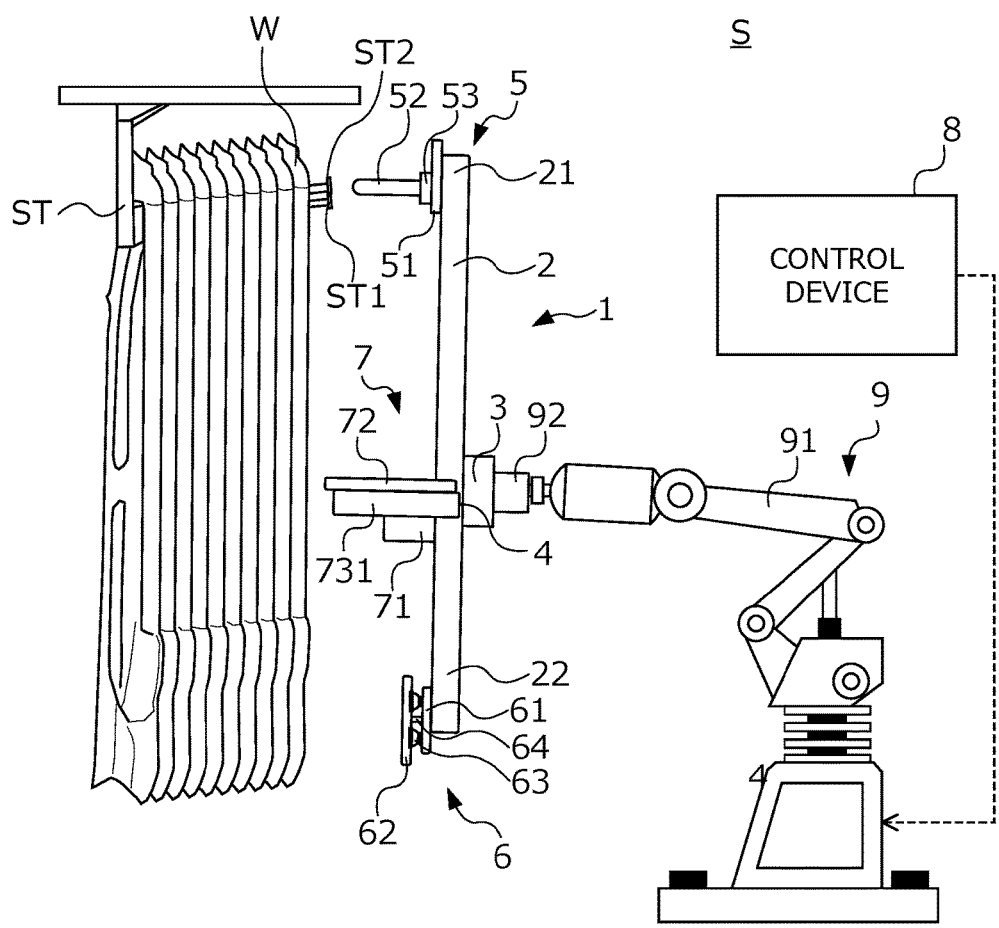
FIG. 1 is a side view of a panel conveyance system to which a panel holding method according to an embodiment of the present invention is applied.
Figure 2:
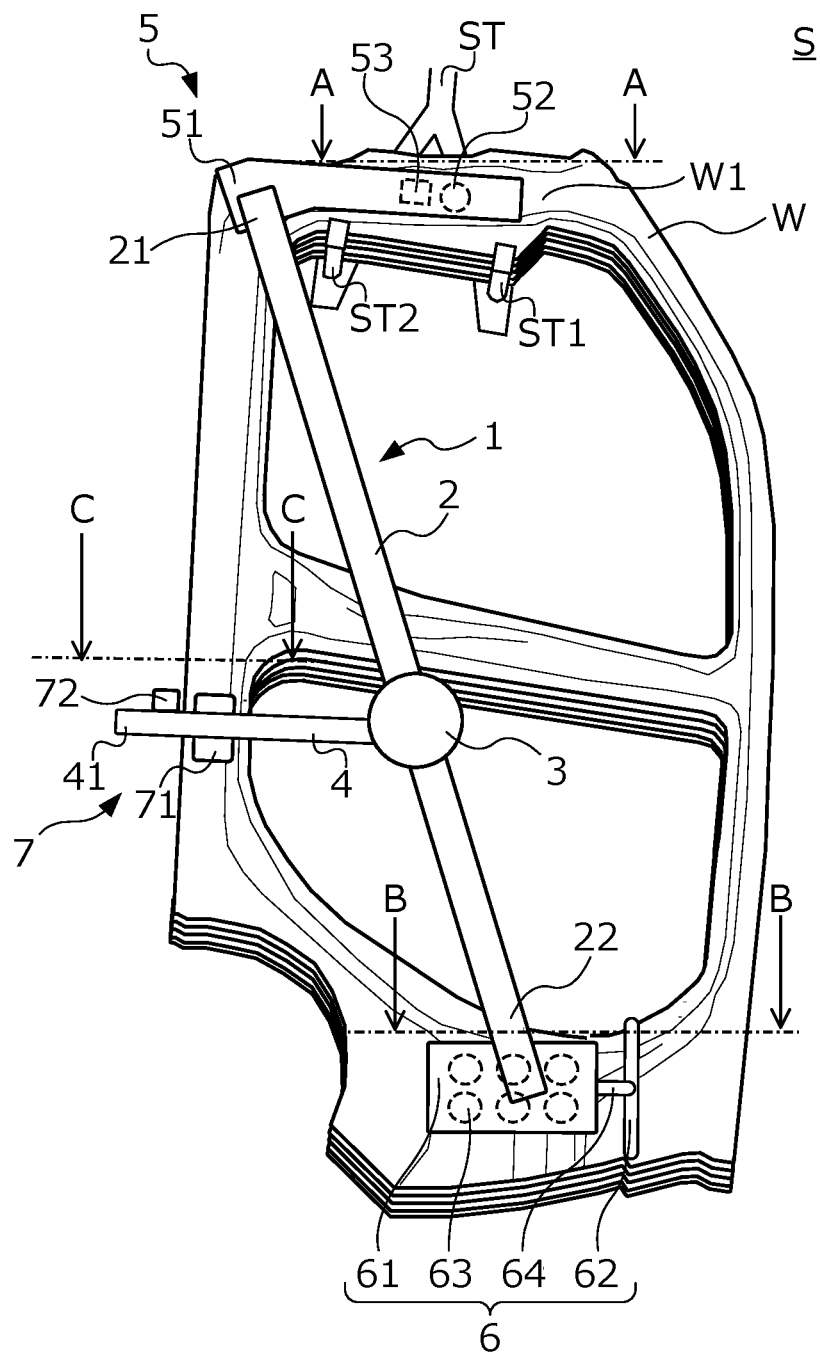
FIG. 2 is a back view of the panel conveyance system.

FIG. 1 is a side view of a panel conveyance system S to which a panel holding method according to the present embodiment is applied, and FIG. 2 is a side view of the panel conveyance system S.

The panel conveyance system S includes a stocker ST in which a plurality of plate-like panels W is aligned and placed, a conveyance robot 9 to which a holding tool 1 that holds the panel W is attached, and a control device 8 that controls the holding tool 1 and the conveyance robot 9. The panel conveyance system S is provided in a vehicle manufacturing line, for example, and takes out one of the plurality of panels W placed in the stocker ST with the holding tool 1 and the conveyance robot 9, and conveys the taken-out panel W to a predetermined position concerning the next step (for example, a welding step).

Figure 3:
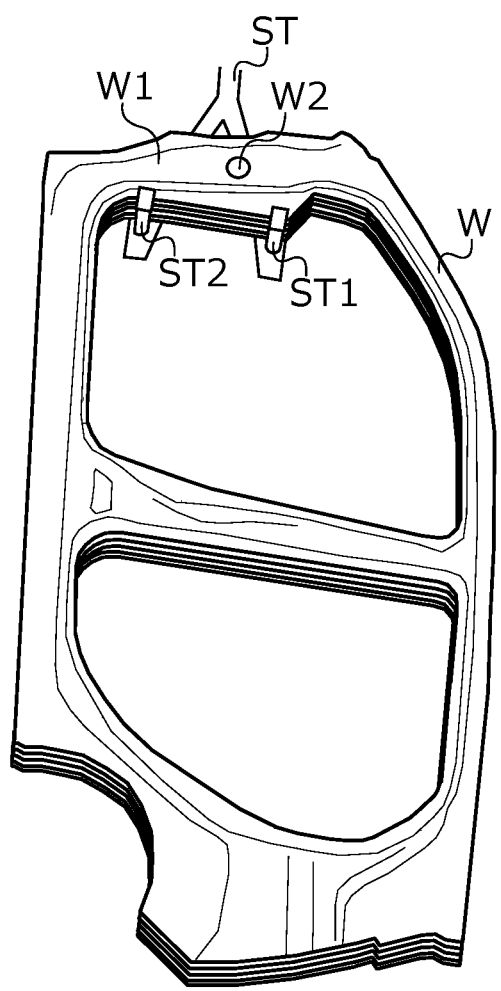
FIG. 3 is a view of a plurality of panels hung on a stocker as viewed from a conveyance robot side.

The panels W are hung in a multiple layer state on the stocker ST having an approximately L shape in side view from a part supply line (not illustrated), and are conveyed to a predetermined take-out position determined in front of the conveyance robot 9. As illustrated in FIG. 3, the panel W is a side panel of a vehicle, for example. The panel W is hung in a state where two arm portions ST1 and ST2 of the stocker ST are in contact with a front pillar W1. Although the panels W are hung in a roughly aligned state by the stocker ST, the panels W are not fixed to the stocker ST, and thus their positions and orientations are slightly different from one another. Further, a hole portion W2 is formed in an approximate center in a width direction of the front pillar W1 of the panel W, the front pillar W1 being placed on a vertically upper side in a hung state on the stocker ST (see FIG. 3).

As illustrated in FIG. 2, the holding tool 1 includes a columnar main frame member 2 extending along a longitudinal direction of the panel W, a tool attaching portion 3 provided in an approximate center of the main frame member 2, a columnar arm member 4 extending from the tool attaching portion 3 in a direction approximately perpendicular to the main frame member 2 and in a short side direction of the panel W, a hanging unit 5 provided in an upper end portion 21 of the main frame member 2 on a vertically upper side, a lower right portion retaining unit 6 provided in a lower end portion 22 of the main frame member 2 on a lower side in the vertical direction, and a lower left portion retaining unit 7 provided in a tip end portion 41 of the arm member 4.

The holding tool 1 is fixed to a tip end portion 92 of an articulated arm 91 of the conveyance robot 9, in the tool attaching portion 3 (see FIG. 1). Therefore, the holding tool 1 can be moved by the conveyance robot 9 by controlling the position and orientation of the top end portion 92 of the articulated arm 91.

The hanging unit 5 includes, as illustrated in FIG. 2, a plate-like frame 51 extending from the upper end portion 21 of the main frame member 2 in the short side direction of the panel W, a rod-like pin member 52 provided on a surface of the frame 51 on a panel W side and protruding approximately perpendicular to the frame 51, and a camera 53 provided on the surface of the frame 51 on the panel W side, and which captures an image of the hole portion W2 and a vicinity of the hole portion W2 of the panel W and transmits image data to the control device 8.

Figure 4:
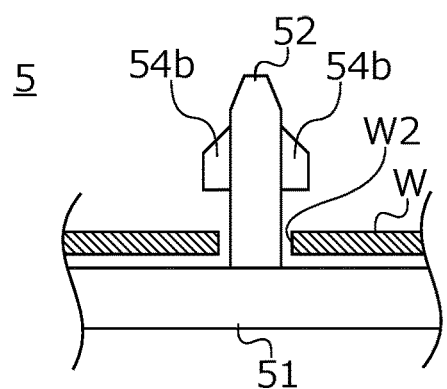
FIG. 4 is a sectional view taken along a horizontal line A-A in FIG. 2.

FIG. 4 is a sectional view taken along the horizontal line A-A in FIG. 2 and is a view of the hanging unit 5 as viewed from vertically above along the longitudinal direction of the panel W. The outer diameter of the pin member 52 is formed to be slightly smaller than the inner diameter of the hole portion W2 of the panel W. With the structure, as illustrated in FIG. 4, the hole portion W2 can be inserted into the pin member 52, and the panel W can be hung on the pin member 52. Further, locking portions 54a and 54b having a larger outer diameter than the inner diameter of the hold portion W2 are provided on a tip end side of the pin member 52 in a freely protruding and retracting manner by a drive source, such as an air pump or a motor (not illustrated). That is, when the locking portions 54a and 54b are buried in the pin member 52 by the drive source, the pin member 52 can be inserted into the hole portion W2. Further, when the locking portions 54a and 54b are allowed to protrude from the pin member 52 after the pin member 52 is inserted into the hole portion W2, the panel W can be prevented from falling off the pin member 52. These locking portions 54a and 54b may be biased to the protruding side on a constant basis by an elastic member or the like.

Referring back to FIG. 2, the lower right portion retaining unit 6 includes a plate-like frame 61 fixed to the lower end portion 22 of the main frame member 2 and extending in the short side direction of the panel W, a rod-like bar pad 62 provided in an end portion of the frame 61 on a right side in FIG. 2 and extending along the longitudinal direction of the panel W, and a plurality of (for example, six) vacuum caps 63 provided in a vicinity of the bar pad 62 and on a surface of the frame 61 on the panel W side. The lower right portion retaining unit 6 retains a portion of a side lower than the hole portion W2 in the vertical direction, of a panel W hung on the pin member 52.

Figure 5:
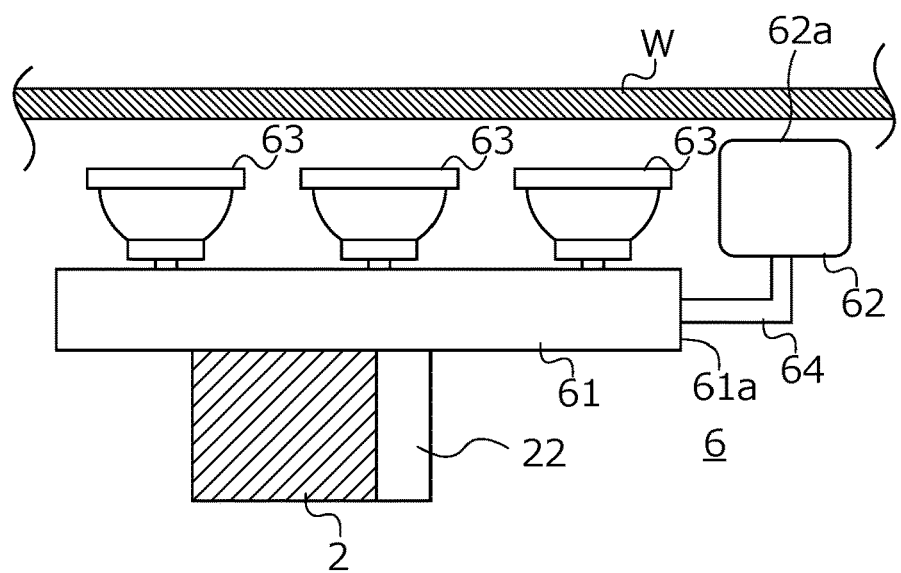
FIG. 5 is a sectional view taken along a horizontal line B-B in FIG. 2.

FIG. 5 is a sectional view taken along the horizontal line B-B in FIG. 2, and is a view of the lower right portion retaining unit 6 as viewed from vertically above along the longitudinal direction of the panel W. The bar pad 62 is fixed to the frame 61 via a bracket 64 extending from an end portion 61a of the frame 61 toward the panel W side. As illustrated in FIG. 5, a contact surface 62a of the bar pad 62 is closest to a surface of the panel W among the various members constituting the lower right portion retaining unit 6. Further, each of the vacuum caps 63 is provided in an extendible/retractable manner from the frame 61 toward the surface of the panel W. That is, when the lower right portion retaining unit 6 is brought close to the surface of the panel W in a state where the vacuum caps 63 are retracted to the frame 61 side, only the contact surface 62a of the bar pad 62 of the lower right portion retaining unit 6 comes into contact with the surface of the panel W. Further, when the vacuum caps 63 are brought to advance toward the panel W side in the state where the contact surface 62a of the bar pad 62 is in contact with the surface of the panel W, and the air in the vacuum caps 63 is removed by a vacuum pump (not illustrated), the surface of the panel W is sucked and retained by the vacuum caps 63 while the bar pad 62 is kept in contact with the surface of the panel W.

Figure 6:
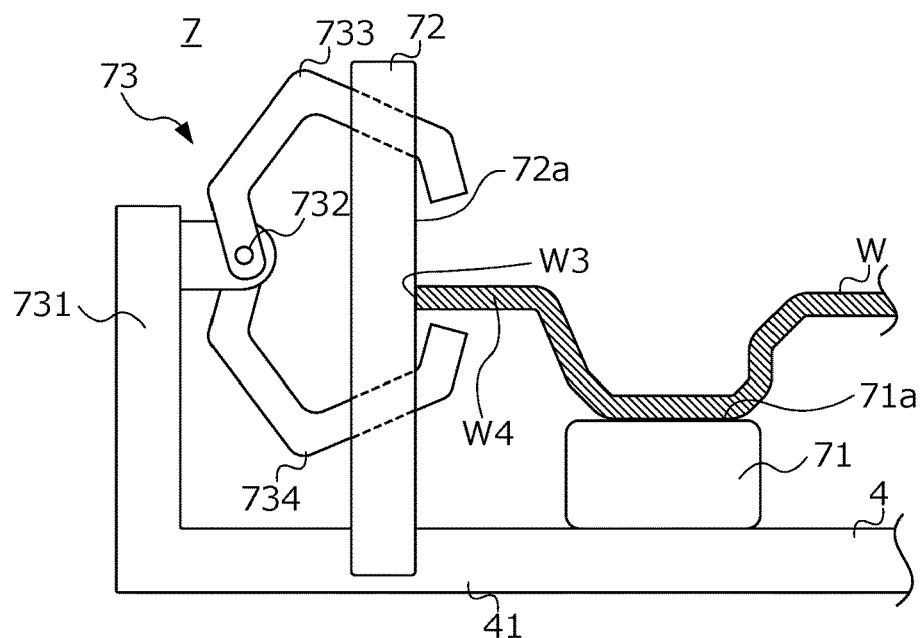
FIG. 6 is a sectional view taken along a horizontal line C-C in FIG. 2.
Figure 7:
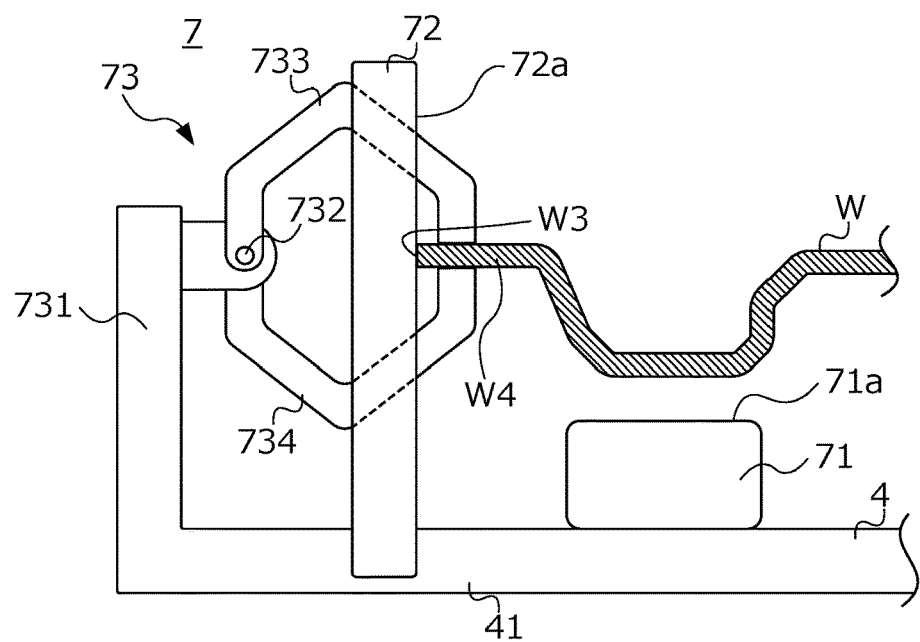
FIG. 7 is a sectional view taken along the horizontal line C-C in FIG. 2.

FIGS. 6 and 7 are sectional views taken along the horizontal line C-C in FIG. 2, and are views of the lower left portion retaining unit 7 as viewed from vertically above along the longitudinal direction of the panel W. As illustrated in FIGS. 2, 6, and 7, the lower left portion retaining unit 7 includes a block pad 71, a bar guide 72, and a clamp 73 provided on the tip end portion 41 of the arm member 4.

The block pad 71 has a cubic shape, and is fixed to a surface of the tip end portion 41 on the panel W side. The bar guide 72 has a rod shape provided in an upper end surface of the arm member 4, and extending approximately perpendicular to the arm member 4, that is, a thickness direction of the panel W. The bar guide 72 is provided in the vicinity of the block pad 71 and outside the block pad 71 (that is, a position more distant from the tool attaching portion 3 than the block pad 71) in the tip end portion 41.

Therefore, by bringing the tip end portion 41 of the arm member 4 close to the panel W while causing an outer edge end W3 of the panel W to be in contact with an inner end surface 72a of the bar guide 72, the contact surface 71a of the block pad 71 can be brought into contact with the surface of the panel W. That is, the lower left portion retaining unit 7 can temporarily retain the panel W by bringing the bar guide 72 into contact with the outer edge end W3 of the panel W and bringing the block pad 71 into contact with the surface of the panel W at the same time.

The clamp 73 is provided in the vicinity of the block pad 71 and outside the block pad 71, on the tip end portion 41. Further, the clamp 73 includes a frame 731 extending from the tip end portion 41 in the thickness direction of the panel W, two claw portions 733 and 734 provided in an openable/closable manner having an axis 732 provided on a tip end side of the frame 731 as a fulcrum, and an actuator (not illustrated) that opens or closes the claw portions 733 and 734. The axis 732 is perpendicular to the thickness direction of the panel W. With the structure, as illustrated in FIG. 7, by bringing both the claw portions 733 and 734 close to each other to the panel W temporarily retained by the block pad 71 and the bar guide 72 as described above along the thickness direction of the panel W, an edge portion W4 of the panel W can be held by both the claw portions 733 and 734 in the thickness direction, and the panel W can be positioned at a prescribed position. Note that the distance from the contact surface 71a of the block pad 71 to the axis 732 along the thickness direction of the panel W is set to be sufficiently larger than the thickness of the panel W. Therefore, as illustrated in FIG. 7, while positioning the clamp 73 can hold the panel W at the position separated from the block pad 71.

Next, a procedure of holding the panel W at a prescribed position and orientation with the holding tool 1 and the conveyance robot 9 will be particularly described, in a procedure of conveying the panel W using the holding tool 1 and the conveyance robot 9 constituted as described above.

Figure 8:
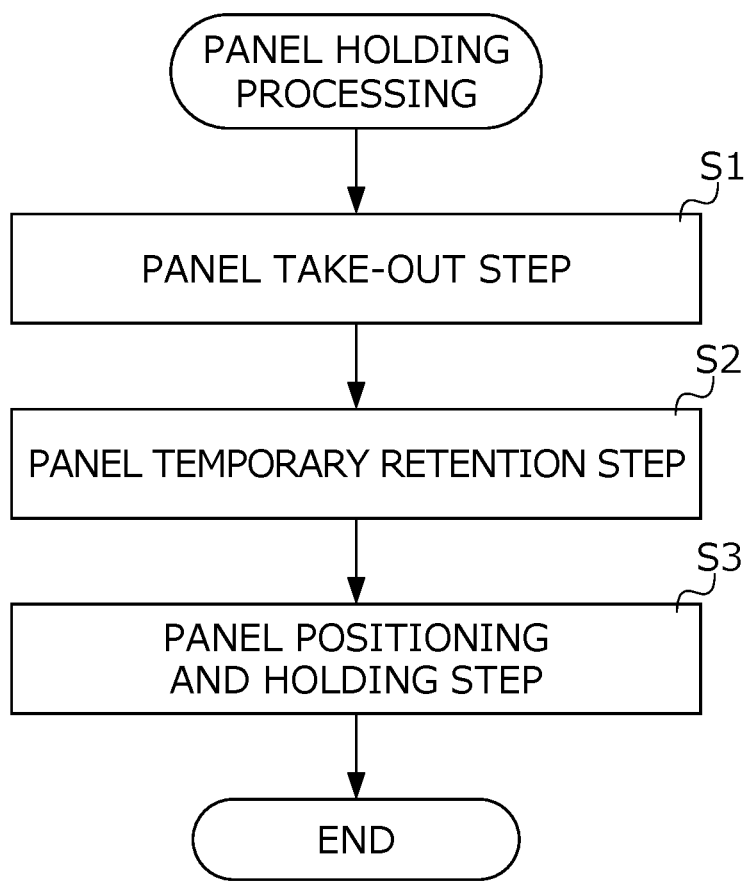
FIG. 8 is a flowchart illustrating a specific procedure of panel holding processing in the panel conveyance system.

FIG. 8 is a flowchart illustrating a specific procedure of panel holding processing in the panel conveyance system. Here, the panel holding processing refers to a processing series of taking out a panel closest to the holding tool 1 from the plurality of panels hung on the stocker ST with the holding tool 1 and the conveyance robot 9, and further while positioning and holding the taken-out panel at a predetermined position.

As illustrated in FIG. 8, the panel holding processing according to the present embodiment is divided into three steps: a panel take-out step (S1) of taking out a panel while hanging the panel on the pin member, a temporary retention step (S2) of temporarily retaining the taken-out panel, and a positioning and holding step (S3) of holding the temporarily retained panel while positioning it. Hereinafter, specific content of the steps will be described with reference to the drawing.

Figure 9:
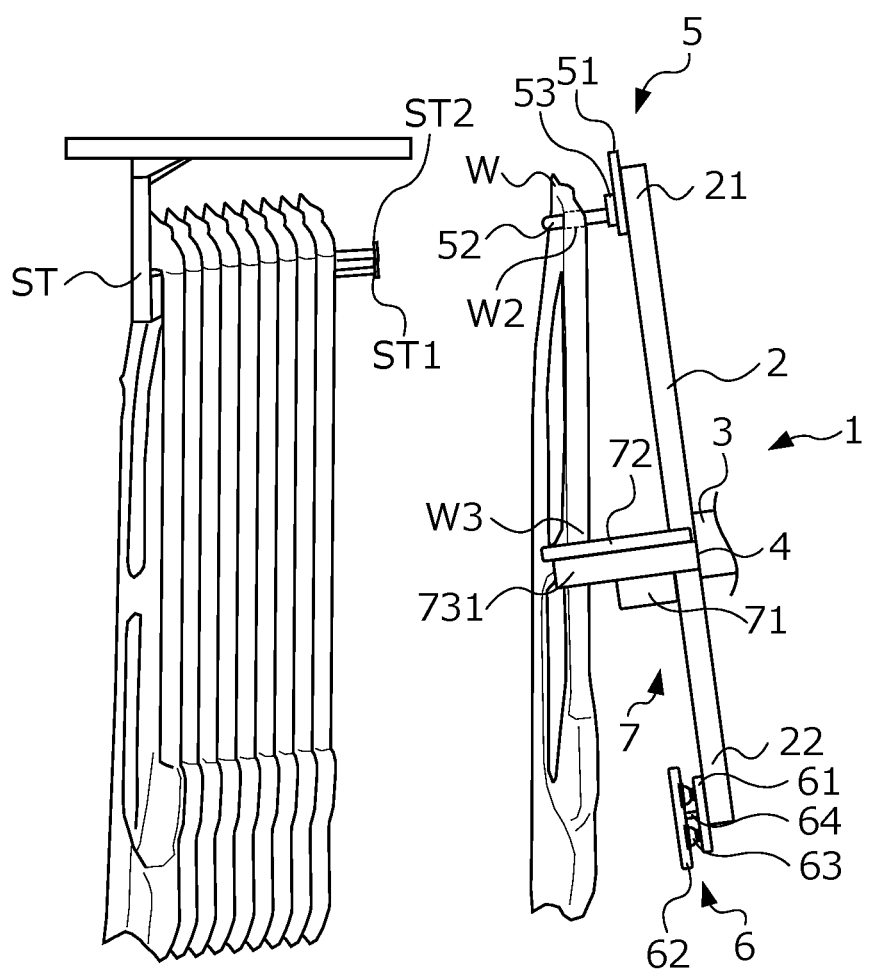
FIG. 9 is a side view of panels and a holding tool in a panel take-out step.

In the panel take-out step in S1, the control device 8 controls the conveyance robot 9 to move the holding tool 1 in front of the panel W hung on the stocker ST, inserts the pin member 52 of the holding tool 1 into the hole portion W2 while detecting the position of the hole portion W2 by capturing an image of the hole portion W2 in the panel W with the camera C, and hangs the panel W on the pin member 52 by further causing the locking portions 54a and 54b to protrude from the pin member 52 to cause the panel W to be in the fall-off prevention state. Further, in S1, the control device 8 takes out the panel W from the stocker ST, as illustrated in FIG. 9 by controlling the conveyance robot 9 to pull the holding tool 1 toward the front side while keeping the panel W hung on the pin member 52. Note that, at this time, it is preferable to slightly separate the lower right portion retaining unit 6 and the lower left portion retaining unit 7 from the surface of the panel W by slightly inclining the main frame member 2 with respect to the panel W. With this step, the panel W can be taken out from the stocker ST while hanging the panel W only on the pin member 52.

Figure 10:
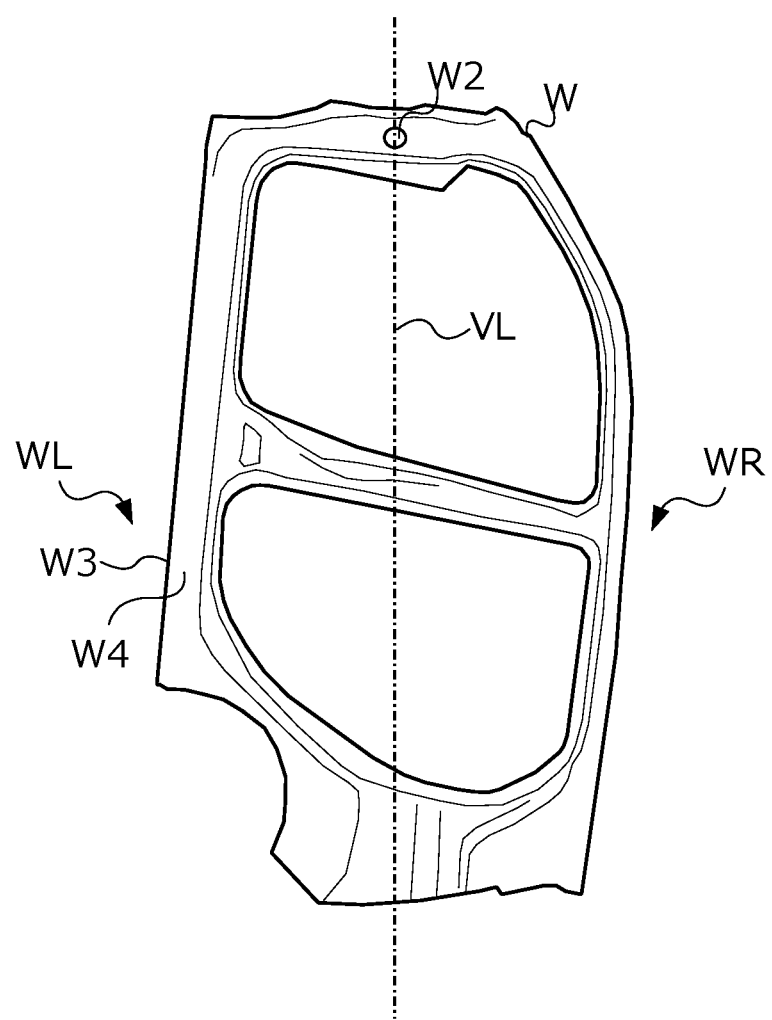
FIG. 10 is a view of a panel in a natural orientation as viewed from the conveyance robot side.

FIG. 10 is a view of the state where the panel W is hung only on the pin member, that is, a view of the panel W in a natural orientation as viewed from a conveyance robot side. The panel W immediately after the panel take-out step in S1 is as illustrated in FIG. 10. Hereinafter, a portion on a right side with respect to a vertical line VL passing through the hole portion W2 as viewed from the conveyance robot and a portion on a side vertically lower than the hole portion W2, of the panel W in the natural orientation as illustrated in FIG. 10, is defined as panel right lower portion WR. Further, a portion on a left side as viewed from the conveyance robot with respect to the vertical line VL and a portion on the side vertically lower than the hole portion W2, of the panel W in the natural orientation, is defined as a panel left lower portion WL.

Next, in the panel temporary retention step in S2, the control device 8 temporarily retains the panel W with the holding tool 1 by the following procedure. Here, the temporarily retaining refers to retaining the panel W by the weight of the panel W without using the clamp 73 and the vacuum caps 63 in a state where the panel W is sufficiently positioned with respect to the holding tool 1.

First, the control device 8 moves the bar pad 62 of the lower right portion retaining unit 6 to a position facing the panel right lower portion WR, moves the block pad 71 of the lower left portion retaining unit 7 to a position facing the panel left lower portion WL, and moves the bar guide 72 of the lower left portion retaining unit 7 to a position outside the outer edge W3 of the panel left lower portion WL (that is, at a position more distant from the vertical line VL than the position of the outer edge end W3) by controlling the conveyance robot 9 to change the orientation of the holding tool 1 with respect to the panel W in the natural orientation while keeping the panel W hung on the pin member 52.

Next, the control device 8 temporarily retains the panel W with the bar pad 62, the block pad 71, and the bar guide 72 by bringing the bar pad 62 into contact with the surface of the panel right lower portion WR, bringing the block pad 71 into contact with the surface of the panel left lower portion WL, and further bringing the bar guide 72 into contact with the outer edge end W3 of the panel left lower portion WL by controlling the conveyance robot 9 to change the orientation of the holding tool 1 with respect to the panel W in the natural orientation while keeping the panel W hung on the pin member 52. To be more specific, the control device 8 temporarily retains the panel W to be scooped up with the bar pad 62, the block pad 71, and the bar guide 72 by performing an operation to press the surface of the panel right lower portion WR toward a back side in the thickness direction of the panel W with the bar pad 62, an operation to press the surface of the panel left lower portion WL toward the back side in the thickness direction of the panel W with the block pad 71, and an operation to press the outer edge end W3 inward with the bar guide 72 at the same time.

Figure 11:
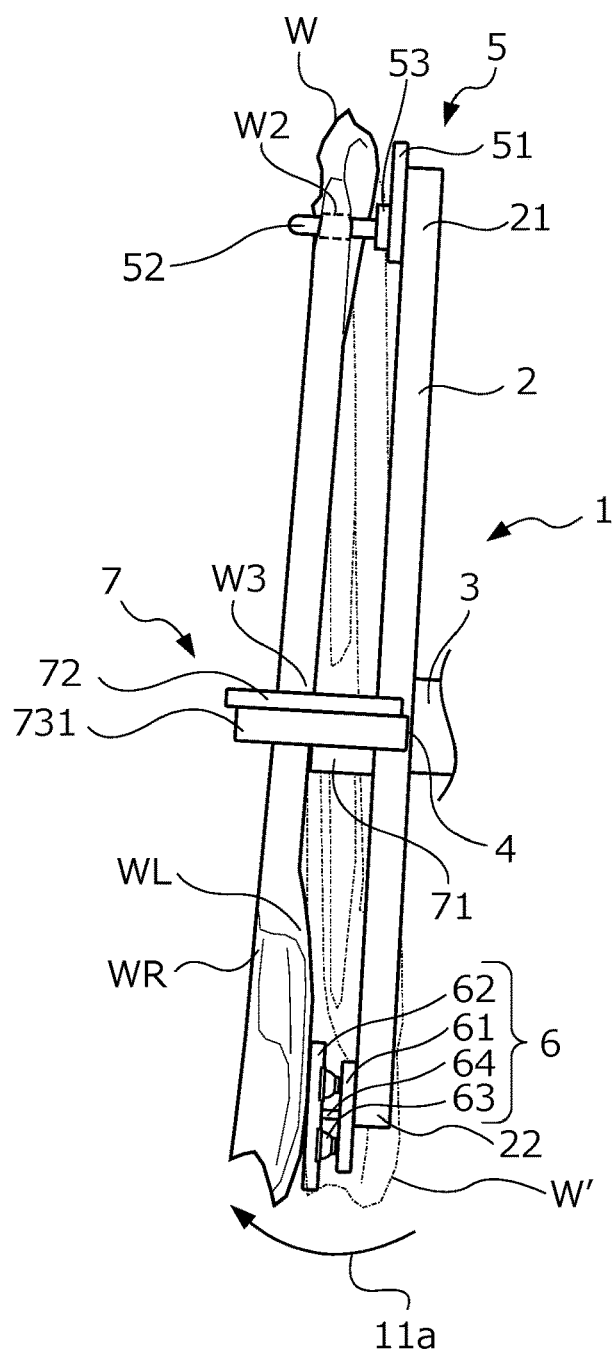
FIG. 11 is a side view of a panel in a temporarily retained state.
Figure 12:
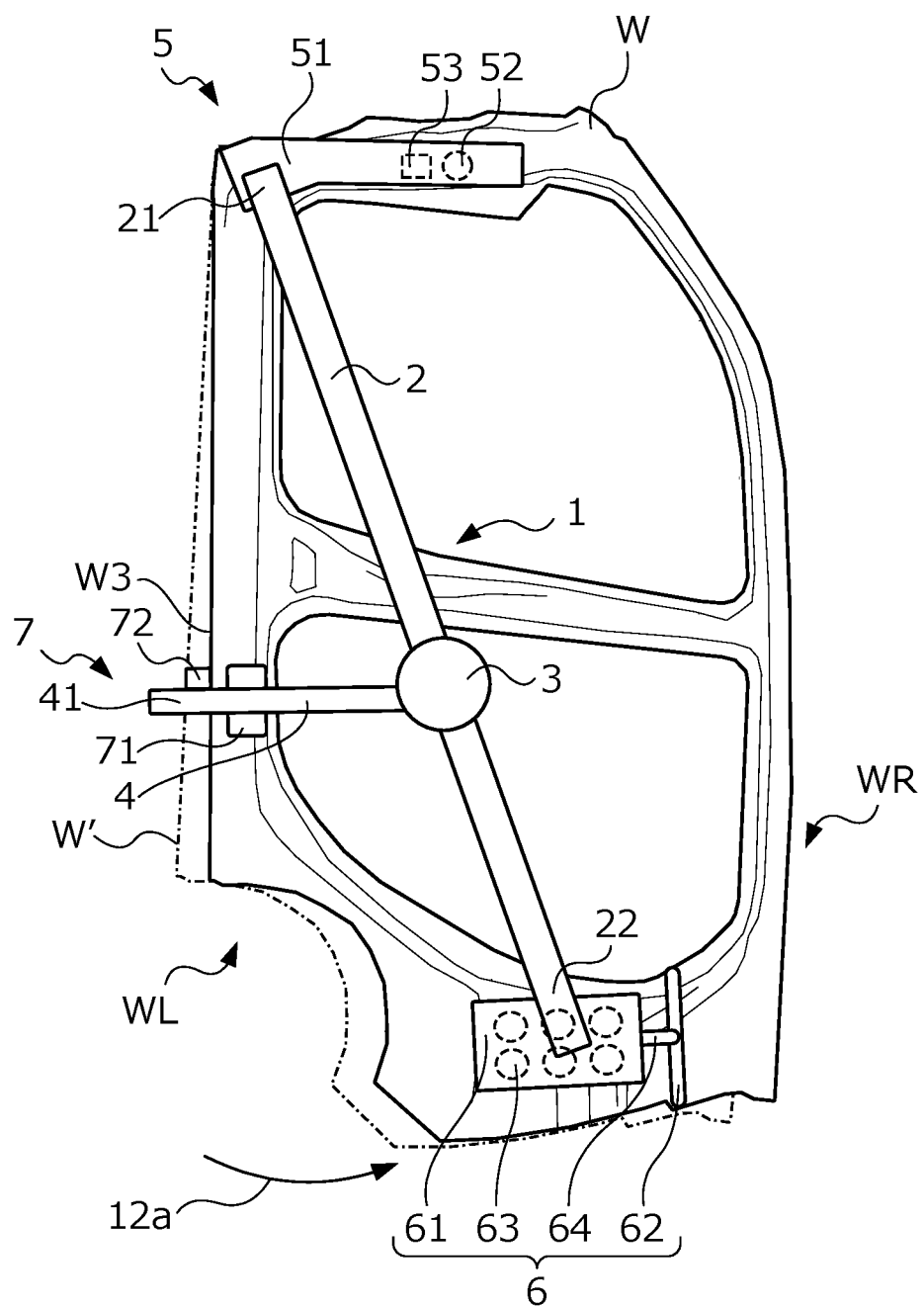
FIG. 12 is a view of a panel in a temporarily retained state as viewed from the conveyance robot side.

FIG. 11 is a side view of the panel W in a temporarily retained state, and FIG. 12 is a view of the panel W in the temporarily retained state as viewed from the conveyance robot side. Note that FIGS. 11 and 12 illustrate, for comparison, a panel W' in the natural orientation by the one-dot chain line with the position of the hole portion being matched.

As described above, in the temporary retention step, the bar pad 62 and the block pad 71 press the panel right lower portion WR and the panel left lower portion WL toward the back side in the thickness direction, respectively. Therefore, as illustrated in FIG. 11, the panel W in the temporarily retained state is slightly inclined toward the back side of the panel W about the hole portion W2 in such a manner that a lower portion of the panel W slightly rises up, as illustrated by the arrow 11a, with respect to the panel W' in the natural orientation extending in the vertical direction, as viewed from a side surface of the panel W. Note that, at this time, when only the panel right lower portion WR or the panel left lower portion WL is pressed, the panel W is rotated around the vertical line as an axis and cannot be positioned. In contrast, in the present embodiment, both the bar pad 62 and the block pad 71 press the panel W, thereby positioning the panel W without rotating the panel W.

Further, in the temporary retention step, the bar guide 72 presses the outer edge end W3 inward. Therefore, as illustrated in FIG. 12, the panel W in the temporarily retained state is slightly inclined in a counterclockwise manner in FIG. 12 about the pin member 52 in such a manner that the panel right lower portion WR slightly rises up, as illustrated by the arrow 12a, with respect to the panel W' in the natural orientation extending in the vertical direction, as viewed from the front of the panel W.

Next, in the panel positioning and holding step in S3, the control device 8 causes the six vacuum caps 63 to suck and retain the surface of the panel right lower portion WR after driving the clamp 73 to hold the edge portion W4 of the panel left lower portion WL in the thickness direction as described with reference to FIGS. 6 and 7 while maintaining the orientation of the holding tool 1 with the orientation of the panel W temporarily retained with the bar pad 62, the block pad 71, and the bar guide 72. With the step, the panel W is supported by the pin member 52 at the hole portion W2 on the vertical line VL, is sucked and retained by the plurality of vacuum caps 63 at the panel right lower portion WR lower than the hole portion W2 and on the right side with respect to the vertical line VL, and is held by the clamp 73 at the panel left lower portion WL lower than the hole portion W2 and on the left side with respect to the vertical line VL. With the above steps, the panel W taken out from the stocker ST is held while positioned by the holding tool 1.

To cancel the held state of the panel W by the holding tool 1, the pin member 52 is pulled out from the hole portion W2 of the panel W after the locking portions 54a and 54b are accommodated not to protrude from the pin member 52, and then the hold by the clamp 73 may just be cancelled.

The panel conveyance system S according to the present embodiment exhibits the following effects.

(1) The panel conveyance system S of the present embodiment controls the conveyance robot 9 while keeping the panel W hung on the pin member 52 to bring the bar pad 62 into contact with the surface of the panel right lower portion WR, bring the block pad 71 into contact with the surface of the panel left lower portion WL, and bring the bar guide 72 into contact with the outer edge end W3 of the panel left lower portion WL, respectively. With the procedure, a reaction force of the panel W to return to the natural orientation acts on the bar pad 62, the block pad 71, and the bar guide 72, and thus the panel W can be temporarily retained at the same position and same orientation by the contact members in a constant manner. Especially, the panel conveyance system S divides the panel W hung on the pin member 52 into the panel right lower portion WR and the panel left lower portion WL with the vertical line VL passing through the hole portion W2, and brings the bar pad 62 into contact with the surface of the panel right lower portion WR and brings the block pad 71 into contact with the surface of the panel left lower portion WL, thereby to temporarily retain the panel W to be scooped up with the bar pad 62 and the block pad 71 while preventing rotation of the panel about the vertical line VL as an axis. Further, the panel conveyance system S can temporarily retain the panel W while suppressing deviation along a plane perpendicular to the thickness direction by bringing the bar guide 72 into contact with the outer edge end W3 of the panel W. Further, the panel conveyance system S causes the clamp 73 to hold the panel left lower portion WL and causes the plurality of vacuum caps 63 to suck the panel right lower portion WR, of the temporarily retained panel W, as described above. With the procedure, the panel W is supported by the pin member 52 at the hole portion W2 on the vertical line VL, is sucked and retained by the plurality of vacuum caps 63 at the panel right lower portion WR lower than the hole portion W2 and on the right side with respect to the vertical line VL, and is held by the clamp 73 at the panel left lower portion WL lower than the hole portion W2 and on the left side with respect to the vertical line VL. Therefore, the panel conveyance system S can hold the panel W at the appropriate position and orientation without using a plurality of sensors. Further, the panel conveyance system S can prevent the panel W from falling off the pin member 52 during the movement of the holding tool 1 by providing, in the pin member 52, the locking portions 54*a* and 54*b* that prevent the panel W from falling off.

(2) The panel conveyance system S holds the panel W by holding the temporarily retained panel W in the thickness direction with the clamp 73. With the procedure, the panel conveyance system S can firmly hold the panel W without substantially changing the position and orientation of the temporarily retained panel W.

(3) The panel conveyance system S can hold a large number of panels at a prescribed holding position without changing a control program of the clamp 73 by setting the holding position of the panels W by the clamp 73 at the position separated from the block pad 71, as illustrated in FIG. 7.

(4) The panel conveyance system S performs the operation to press the surface of the panel right lower portion WR toward the back side in the thickness direction with the bar pad 62, the operation to press the panel left lower portion WL toward the back side in the thickness direction with the block pad 71, and the operation to press the outer edge end W3 of the panel left lower portion WL inward with the bar guide 72 in combination. With the operations, the panel conveyance system S can temporarily retain the panel W at the appropriate position and orientation to scoop up the panel W with the bar pad 62, the block pad 71, and the bar guide 72, using the reaction force of the panel W to return to the natural orientation.

(5) The panel conveyance system S can firmly hold the panel W without substantially changing the position and orientation of the temporarily retained panel W by causing the vacuum caps 63 to suck the panel right lower portion WR after causing the clamp 73 to hold the panel left lower portion WL.

An embodiment of the present invention has been described. However, the present invention is not limited to the embodiment.

What is claimed is:

1. A panel holding device for holding a panel in which a hole portion is formed,
the panel being placed in a stocker to arrange the hole portion on an upper side in a vertical direction,
the panel holding device comprising:
a detection device configured to detect a position of the hole portion;
a pin member to be inserted into the hole portion;
a fall-off prevention mechanism configured to prevent the panel hung on the pin member from falling off the pin member;
a frame member supporting the pin member;
a first contact member supported by the frame member to face a first panel portion which is a first side portion of the panel with respect to a vertical line passing through the hole portion in a state where the panel is hung on the pin member;
a sucking device supported by the frame member in a vicinity of the first contact member and configured to suck the first panel portion;
a second contact member supported by the frame member to face a second panel portion which is a second side portion of the panel with respect to the vertical line in the state where the panel is hung on the pin member;
a third contact member supported by the frame member to be positioned outside an outer edge end of the second panel portion in the state where the panel is hung on the pin member;
a holding device supported by the frame member in a vicinity of the third contact member and configured to hold the second panel portion;
a moving device configured to move the frame member; and
a control device configured to control the moving device, the sucking device, the holding device, and the fall-off prevention mechanism, and
the control device comprising:
a panel take-out control unit configured to cause the pin member to be inserted into the hole portion and cause the fall-off prevention mechanism to be in a fall-off prevention state to hang the panel on the pin member by controlling the moving device using an output of the detection device;
a temporary retention control unit configured to cause the first contact member to come into contact with a surface of the first panel portion, cause the second contact member to come into contact with a surface of the second panel portion, and cause the third contact member to come into contact with the outer edge end of the second panel portion to temporarily retain the panel by controlling the moving device while keeping the panel hung on the pin member; and
a holding control unit configured to cause the holding device to hold the second panel portion and cause the sucking device to suck the first panel portion of the temporarily retained panel.

2. The panel holding device according to claim 1, wherein the holding device is a clamp that holds the second panel portion in a thickness direction of the second panel portion.

3. The panel holding device according to claim 2, wherein the holding device holds the second panel portion while positioning it at a predetermined holding position, and the second panel portion positioned at the holding position is separated from the second contact member.

4. The panel holding device according to claim 2, wherein the temporary retention control unit presses the surface of the first panel portion toward a back side in a thickness direction with the first contact member, presses the surface of the second panel portion toward a back side in the thickness direction with the second contact member, and further presses the outer edge end of the second panel portion inward with the third contact member to temporarily retain the panel by controlling the moving device while keeping the panel hung on the pin member.

5. The panel holding device according to claim 2, wherein the holding control unit causes the sucking device to suck the first panel portion after causing the holding device to hold the second panel portion.

6. The panel holding device according to claim 1, wherein the holding device holds the second panel portion while positioning it at a predetermined holding position, and the second panel portion positioned at the holding position is separated from the second contact member.

7. The panel holding device according to claim 6, wherein the temporary retention control unit presses the surface of the first panel portion toward a back side in a thickness direction with the first contact member, presses the surface of the second panel portion toward a back side in the thickness direction with the second contact member, and further presses the outer edge end of the second panel portion inward with the third contact member to temporarily retain the panel by controlling the moving device while keeping the panel hung on the pin member.

8. The panel holding device according to claim 6, wherein the holding control unit causes the sucking device to suck the first panel portion after causing the holding device to hold the second panel portion.

9. The panel holding device according to claim 1, wherein the temporary retention control unit presses the surface of the first panel portion toward a back side in a thickness direction with the first contact member, presses the surface of the second panel portion toward a back side in the thickness direction with the second contact member, and further presses the outer edge end of the second panel portion inward with the third contact member to temporarily retain the panel by controlling the moving device while keeping the panel hung on the pin member.

10. The panel holding device according to claim 9, wherein the holding control unit causes the sucking device to suck the first panel portion after causing the holding device to hold the second panel portion.

11. The panel holding device according to claim 1, wherein the holding control unit causes the sucking device to suck the first panel portion after causing the holding device to hold the second panel portion.

12. A panel holding method for holding a panel in which a hole portion is formed, using a panel holding device in which a pin member, a sucking device, and a holding device are provided, the panel being placed in a stocker to arrange the hole portion on an upper side in a vertical direction, the panel holding device including the pin member to be inserted into the hole portion, a fall off prevention mechanism configured to prevent the panel hung on the pin member from falling off the pin member, a frame member supporting the pin member, a first contact member supported by the frame member to face a first panel portion, when the panel hung on the pin member is divided into right and left portions by a vertical line passing through the hole portion, the sucking device supported by the frame member in a vicinity of the first contact member and configured to suck the first panel portion, a second contact member supported by the frame member to face the second panel portion in the state where the panel is hung on the pin member, a third contact member supported by the frame member to be positioned outside an outer edge end of the second panel portion in the state where the panel is hung on the pin member, and the holding device supported by the frame member in a vicinity of the third contact member and configured to hold the second panel portion, the panel holding method comprising:

an installation step of placing the panel on a stocker such that the hole portion is arranged on an upper side in the vertical direction, a panel take-out step of inserting the pin member into the hole portion to hang the panel on the pin member by moving the panel holding device;

a temporary retention step of causing a portion of the panel holding device to come into contact with a surface of a first panel portion which is a first side portion of the panel with respect to a vertical line passing through the hole portion, a surface of a second panel portion which is a second side portion of the panel with respect to the vertical line, and an outer edge end of the second panel portion to temporarily retain the panel by changing an orientation of panel holding device with respect to the panel while keeping the panel hung on the pin member; and a holding step of causing the holding device to hold the second panel portion and causing the sucking device to suck the first panel portion, of the temporarily retained panel.

* * * * *